US011451962B2

(12) United States Patent
Obaidi (10) Patent No.: US 11,451,962 B2
(45) Date of Patent: Sep. 20, 2022

(54) NETWORK-BASED PROTECTION AGAINST SCAM APPLICATIONS

(71) Applicant: T-Mobile USA, Inc., Bellevue, WA (US)

(72) Inventor: Ahmad Arash Obaidi, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 330 days.

(21) Appl. No.: 15/931,480

(22) Filed: May 13, 2020

(65) Prior Publication Data
US 2021/0360407 A1     Nov. 18, 2021

(51) Int. Cl.
| | |
|---|---|
| *H04W 12/122* | (2021.01) |
| *G06Q 30/00* | (2012.01) |
| *G06Q 30/04* | (2012.01) |
| *G06Q 50/26* | (2012.01) |
| *G06F 8/61* | (2018.01) |

(Continued)

(52) U.S. Cl.
CPC ............ *H04W 12/122* (2021.01); *G06F 8/62* (2013.01); *G06N 5/04* (2013.01); *G06N 20/00* (2019.01); *G06Q 30/0185* (2013.01); *G06Q 30/04* (2013.01); *G06Q 50/265* (2013.01);
(Continued)

(58) Field of Classification Search
CPC ..... H04W 12/122; H04W 12/08; H04W 4/12; H04W 88/02; H04W 4/24; H04W 12/12; G06F 8/62; G06F 21/55; G06N 5/04; G06N 20/00; G06Q 30/0185; G06Q 30/04; G06Q 50/265; H04L 63/1425; H04L 63/1441; H04L 63/1458; H04L 63/1466; H04L 63/1475; H04M 15/04; H04M 15/06; H04M 15/47; H04M 15/888
See application file for complete search history.

(56) References Cited

U.S. PATENT DOCUMENTS

| | | | |
|---|---|---|---|
| 9,729,727 B1* | 8/2017 | Zhang | ................... H04W 4/24 |
| 10,035,218 B2 | 7/2018 | Takada | |
| 2018/0324299 A1 | 11/2018 | Sial et al. | |

OTHER PUBLICATIONS

Li, Wenjia, Jigang Ge, and Guqian Dai. "Detecting malware for android platform: An svm-based approach." 2015 IEEE 2nd International Conference on Cyber Security and Cloud Computing. IEEE, 2015. (Year: 2015).*

\* cited by examiner

*Primary Examiner* — Sharad Rampuria
(74) *Attorney, Agent, or Firm* — Han Santos, PLLC (57) ABSTRACT

Outgoing communications from a user device are monitored following a notification that an application is installed on a user device. When a number of the outgoing communications to a premium-rate number during a predetermined period of time exceeds a corresponding quantity threshold, the pattern of the outgoing communications may be ascertained to be anomalous. A user device is directed to present a prompt that requests an input as to whether the outgoing communications are authorized. In response to a first input that the outgoing communications are unauthorized, additional outgoing communications from the user device to the premium-rate number are blocked for a predesignated amount of time. Further, the first input is stored as a corresponding vote that the application is malicious. In response to a second input that the outgoing communications are authorized, the second input is stored as a corresponding vote that the application is non-malicious.

18 Claims, 6 Drawing Sheets

(51) Int. Cl.
*H04W 12/08* (2021.01)
*G06N 20/00* (2019.01)
*G06N 5/04* (2006.01)
*H04L 9/40* (2022.01)
*H04W 4/12* (2009.01)
*H04W 88/02* (2009.01)

(52) U.S. Cl.
CPC ......... *H04L 63/1425* (2013.01); *H04W 12/08* (2013.01); *H04W 4/12* (2013.01); *H04W 88/02* (2013.01)

NETWORK-BASED PROTECTION AGAINST SCAM APPLICATIONS

BACKGROUND

Users may inadvertently download malicious applications onto their user devices from third-party application platforms. In some instances, a malicious application may be designed to make a silent call or surreptitiously send a message to a premium-rate number (e.g., a 1-900 number) without a user's knowledge or input. In other instances, the malicious application may display a fake user interface link or button that purports to allow the user to perform a desired action, e.g., answer a survey, vote for a person or item, view some interesting content, etc. However, the real purpose of the fake link or button is to trick the user into initiating an outgoing communication, such as a silent call or a message, to a premium-rate phone number without the user's consent. The user is then charged an exorbitant fee by the malicious entity that is behind the premium-rate number. Since most of these malicious entities are located in foreign countries, it may be difficult for subscribers to dispute the charges. In additional instances, malicious actors may also use similar techniques to silently make calls or send messages to emergency services to disrupt emergency services or harass subscribers.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to network-based techniques for monitoring outgoing communications from a suspected scam application installed on a user device of a subscriber to prevent the suspected scam application from initiating outgoing communications without the permission of the subscriber. A wireless carrier network operated by a mobile network operator (MNO) may use a scam protection service to monitor an outgoing pattern of voice calls or messages from a user device after a new application is installed on the user device. In various embodiments, the scam protection service may detect that a number of outgoing communications to a premium-rate number or an emergency services number exceeded a quantity threshold for a predetermined period of time. The quantity threshold is established to allow the user device to place a limited number of premium-rate or emergency services number communications in the predetermined period of time without triggering further scrutiny by the scam protection service. However, if the scam protection service is triggered, the scam protection service may use pattern matching or machine-learning techniques to determine whether the outgoing pattern is an anomalous pattern. Once the outgoing pattern is determined to be anomalous, the scam protection service may direct the user device to prompt a user to indicate whether the communications are authorized communications.

In one scenario, if the user indicates that the communications to a premium-rate number are unauthorized communications, additional communications to the premium-rate number from the user device may be blocked for a designated amount of time. The user's indication is also counted as a vote that designates the new application as a malicious application. In this way, when a sufficient percentage of such votes are received, i.e., crowdsourced, from multiple user devices during a predesignated period of time, the scam protection service may direct the user device to alert the user of the user device to remove the new application. Further, users of other user devices that newly install the application are also recommended to remove the application from their user devices.

In another scenario, if the user indicates that the communications to an emergency services number are unauthorized, the user device is immediately directed to warn the user to remove the new application. The user's indication is also counted as a vote that designates the new application as a malicious application. In this way, when a sufficient percentage of such votes are received, e.g., crowdsourced from multiple user devices during a predesignated period of time, users of other user devices that newly install the application are also recommended to remove the application from their user devices.

The techniques may enable an MNO to protect subscribers from scam applications that are designed to fraudulently obtain money from the subscribers and/or harass the subscribers. In this way, rather than merely acting as a communication conduit for subscriber data, the MNO may play a key role in protecting subscribers from malicious actors and increase subscriber satisfaction with the services provided by the MNO. The techniques described herein may be implemented in a number of ways. Example implementations are provided below with reference to the following figures.

Example Architecture

Figure 1:
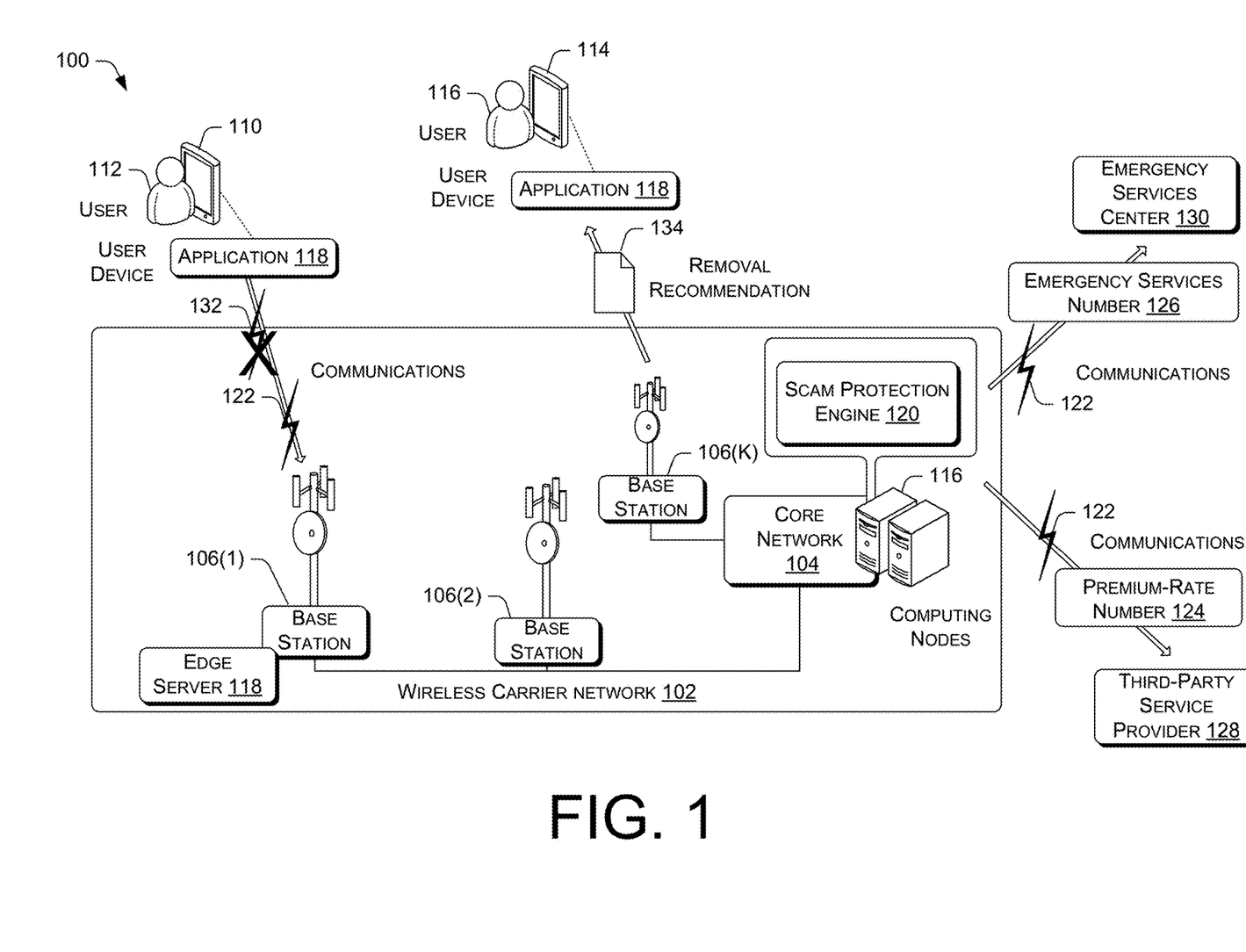
FIG. 1 illustrates an example architecture for a wireless carrier network to implement network-based protection to protect subscribers from scam applications that initiate outgoing communications without the permission of the subscribers.

FIG. 1 illustrates an example architecture 100 for a wireless carrier network to implement network-based protection to protect subscribers from scam applications that initiate outgoing communications without the permission of the subscribers. The wireless carrier network 102 may provide a wide range of mobile communication services, as well as ancillary services and features, to subscribers and associated mobile device users. The wireless carrier network 102 may be operated by a mobile network operator (MNO). In various embodiments, the wireless carrier network 102 may provide wireless communications between multiple user devices. Further, the wireless carrier network 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network 104 by a wide area network (WAN). Each regional portion of the wireless carrier network 102 may include one or more RANs and a regional circuit and/or packet-switched network and associated signaling network facilities. The wireless carrier network 102 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth.

A RAN of the wireless carrier network 102 may include a number of base stations, such as the base stations 106(1)-106(K), also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and the core network 104. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 104. The core network 104 may connect to a public packet data communication network, such as the Internet, via one or more gateways. Accordingly, data and voice communications via the RANs, the core network, and the Internet may support a variety of telecommunication services through the wireless carrier network 102.

The wireless carrier network 102 may provide telecommunication services to multiple user devices. In some instances, the user devices may include smartphones, tablet computers, embedded computer systems, or any other device that is capable of using the wireless communication services that are provided by the wireless carrier network 102. For example, a user device 110 of a user 112 may be in communication with the base station 106(1). Likewise, a user device 114 of a user 116 may be in communication with the base station 106(2).

In various embodiments, the user 112 may download and install an application 118 onto the user device 110. In such embodiments, a monitoring function on the user device 110 may notify a scam protection engine 120 that the application 118 is installed on the user device 110. Subsequently, the scam protection engine 120 may monitor outgoing communications from user device 110. In some instances, the scam protection engine 120 may detect that a number of outgoing communications 122 to a premium-rate number (e.g., the premium-rate number 124) or an emergency services number (e.g., the emergency services number 126) exceeded a quantity threshold established for a predetermined period of time. A premium-rate number is a number that can be called or messaged to obtain a service from a third-party service provider (e.g., third-party service provider 128), in which the subscriber is charged a fee for the service. The fee is billed by the wireless carrier network 102 to the subscriber (e.g., the user 112) on behalf of the third-party service provider 128 and paid to the third-party service provider 128. An emergency services number is a number that is associated with an emergency dispatch center (e.g., emergency services center 130) that is responsible for dispatching police, fire, and/or medical services. The emergency services center may be referred to as a 911 call center, a public safety answering point (PSAP), or a public safety access point.

The outgoing communications may include voice calls, messages, or a combination of voice calls or messages. As used herein, messages may refer to Short Message Service (SMS) messages, Rich Communication Services (RCS) messages, Multimedia Messaging Service (MMS) messages, and/or so forth. The quantity threshold is established to allow the user device 110 to place a limited number of premium-rate or emergency services number communications in a predetermined period of time without triggering further scrutiny by the scam protection engine 120. However, if the number of outgoing communications exceeds the quantity threshold the scam protection engine 120 may use a pattern matching algorithm or a machine-learning algorithm to determine whether the outgoing pattern is an anomalous pattern. Once the outgoing pattern is determined to be anomalous, the scam protection engine 120 may direct the user device 110 to prompt the user 112 to indicate whether the communications are authorized communications. For example, the user device 110 may be directed to present a warning prompt to the user 112. The presentation of the warning prompt may be accomplished by a visual notification message that is displayed on a display of the user device 110. In some instances, the visual notification message may be accompanied by an audible message that is transmitted via an audio speaker of the user device 110. The warning prompt that is presented may feature selection controls (e.g., buttons, checkboxes, etc.) that enable the user to select an indication of whether the communications are authorized and send the indication to the scam protection engine 120.

For example, if the user 112 indicates that the outgoing communications 122 to the premium-rate number 124 are unauthorized communications, additional communications 132 to the premium-rate number 124 from the user device 110 may be blocked for a designated amount of time. The indication of the user 112 is also counted as a vote that designates the application 118 as a malicious application. In this way, when a sufficient percentage of such votes are received, i.e., crowdsourced, from multiple user devices during a predesignated period of time, the scam protection engine 120 may direct the monitoring function on the user device 110 to alert the user 112 of the user device 110 to remove (e.g., uninstall) new application 118. Further, users of other user devices that newly install the application are also recommended to remove the application from their user devices. For example, the user 116, who has also installed the application 118 on the user device 114 may receive a removal recommendation 134 to remove the application 118 from the user device 114.

In another example, if the user 112 indicates that the outgoing communications 122 to the emergency services number 126 are unauthorized, the user device 110 may be immediately directed to warn the user to remove the application 118. The indication of the user 112 is also counted as a vote that designates the application 118 as a malicious application. In this way, when a sufficient percentage of such votes are received, e.g., crowdsourced from multiple user devices during a predesignated period of time, users of other user devices that newly install the application are also recommended to remove the application from their user devices. For example, the user 116, who has also installed the application 118 on the user device 114 may receive a removal recommendation 134 to remove the application 118 from the user device 114.

Example User Device Components

Figure 2:
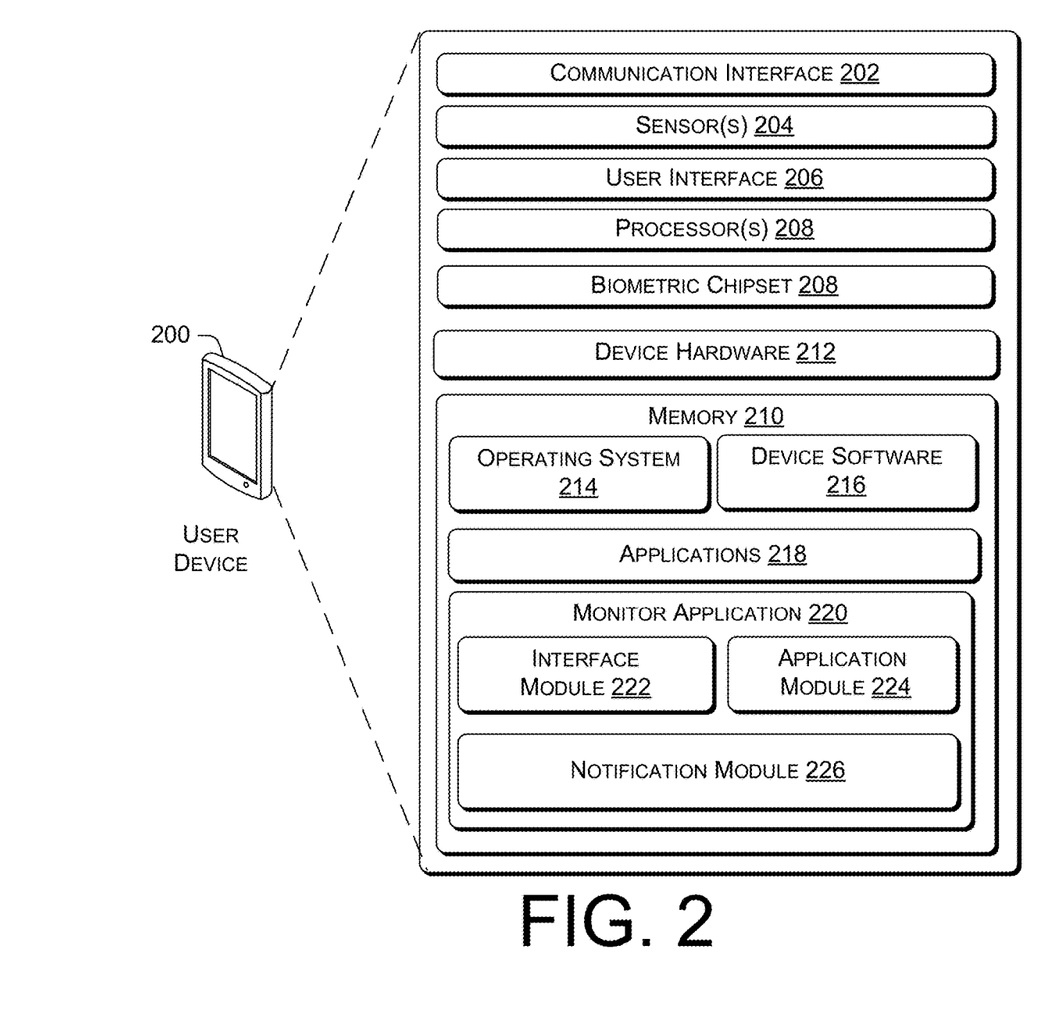
FIG. 2 is a block diagram showing various components of a user device that interfaces with a scam protection engine of a wireless carrier network that protects subscribers from scam applications that initiate outgoing communications without the permission of the subscribers.

FIG. 2 is a block diagram showing various components of a user device that interfaces with a scam protection engine of a wireless carrier network that protects subscribers from scam applications that initiate outgoing communications without the permission of the subscribers. The user device 200 may include a communication interface 202, one or more sensors 204, a user interface 206, one or more processors 208, memory 210, and device hardware 212. In at least one example, the one or more processors 208 may include one or more central processing units (CPUs), one or more graphics processing units (GPUs), and/or any other processing units. Each of the one or more processors 208 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The communication interface 202 may include wireless and/or wired communication components that enable the user device 200 to transmit or receive voice or data communication via the wireless carrier network 102, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect movement of objects that are proximate to the user device 200. The compass, the accelerometer, and the GPS sensor may detect orientation, movement, and geolocation of the user device 200. The cameras may capture images of the environment around the user device 200.

The user interface 206 may enable a user to provide input and receive output from the user device 200. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include a modem that enables the user device 200 to perform telecommunication and data communication with the wireless carrier network 102. The device hardware 212 may further include signal converters, antennas, hardware decoders and encoders, graphic processors, a universal integrated circuit card (UICC) or an embedded UICC (eUICC), and/or the like that enable the user device 200 to execute applications and provide telecommunication and data communication functions. In some embodiments, the device hardware 212 may include an artificial intelligence (AI) chipset that is capable of performing various high-level machine-learning and analytic functions, such as behavioral biometric analysis.

The one or more processors 208 and the memory 210 of the user device 200 may implement an operating system 214, device software 216, one or more applications 218, and a monitor application 120. Such software may include routines, program instructions, objects, and/or data structures that are executed by the processors 208 to perform particular tasks or implement particular abstract data types.

The operating system 214 may include components that enable the user device 200 to receive and transmit data via various interfaces (e.g., user controls, communication interface 202, and/or memory input/output devices). The operating system 214 may also process data using the one or more processors 208 to generate output based on input that is received via the user interface 206. For example, the operating system 214 may provide an execution environment for the execution of the applications 218. The operating system 214 may include a presentation component that presents the output (e.g., display the data on an electronic display, store the data in memory, transmit the data to another secure endpoint device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device 200 to perform functions. For example, the device software 216 may include basic input/output system (BIOS), bootrom, or a bootloader that boots up the user device 200 and executes the operating system 214 following the powerup of the device.

The applications 218 may include applications that provide communication, utility, entertainment, and/or productivity functionalities to a user of the user device 200. For example, the applications 218 may include telephony applications, electronic mail applications, remote desktop applications, web browser applications, navigation applications, office productivity applications, multimedia streaming applications, an online shopping application, and/or so forth. The applications 218 may include applications that are download third-party web stores and portals. In some instances, the applications 218 may include an application that is configured to place communications to premium-rate numbers or emergency services numbers without the permission of a user.

The monitor application 220 may perform the monitoring function described in FIG. 1. Accordingly, the monitor application may include an interface module 222, an application module 224, and a notification module 226. In various embodiments, the monitor application 220 may be an over-the-top (OTT) application or a native application of the operating system 214. In some embodiments, the monitor application 220 may be a client application provided by the wireless carrier network 102. The interface module 222 may receive instructions from the scam protection engine 120 and provide requested data to the scam protection engine 120 In various embodiments, the interface module 222 may include multiple application program interfaces (APIs) that can be called by the scam protection engine 120 to perform specific tasks. The instructions may include commands for the application module 224 to start and stop monitoring of application installations on the user device 200, commands for the notification module 226 to present warning prompts and application uninstallation recommendations via the user interface 206. The interface module 222 may further pass user selections that are inputted via the user interface 206 to the scam protection engine 120.

The application module 224 may send an installation notification to the scam protection engine 120 when a new application is installed on the user device 200. The application module 224 may discover the installation of the new application by access application installation information stored by the operating system 214. For example, the application installation information may be stored in an application installation log, an operating system program registry, or some other data store of the operating system 214. The installation notification may include information such as an application identifier of the application, version information for the application, time and date of the application installation, application configuration setting information, operating system permission settings, and/or so forth.

The notification module 226 may use the user interface 206 to present warning prompts and recommendations regarding applications installed on the user device. In some embodiments, the notification module 226 may present a warning prompt when a number of communications placed from the user device 200 to a premium-rate number following an installation of the application is determined by the scam protection engine 120 to have exceeded a quantity threshold that is established for a predetermined period of time. For example, the predetermined period of time may be 8 hours, 12 hours, 24 hours, etc. The presentation of the warning prompt may be accomplished by a visual notification message that is displayed on a display of the user device 200. In some instances, the visual notification message may be accompanied by an audible message that is transmitted via an audio speaker of the user device 200. The warning prompt may include details regarding the outgoing communications, such as the premium-rate number that received the communications, time and date of each communication, duration of each communication, fees for each communication, a cost summary of fees for all of the communications, and/or so forth. In some instances, the warning prompt that is presented may feature two selection controls (e.g., buttons, checkboxes, etc.). The first selection control may enable a user to indicate that the communications are authorized, and the second selection control may enable the user to indicate that the communications are unauthorized. Thus, depending on the particular input passed by the interface module 222 to the scam protection engine 120, the scam protection engine 120 may take the appropriate action.

In other embodiments, the notification module 226 may present a warning prompt when a number of communications placed from the user device 200 to an emergency services number following an installation of the application is determined by the scam protection engine 120 to have exceeded a quantity threshold that is established for a predetermined period of time. For example, the predetermined period of time may be 8 hours, 12 hours, 24 hours, etc. The presentation of the warning prompt may be accomplished by a visual notification message that is displayed on a display of the user device 200. In some instances, the visual notification message may be accompanied by an audible message that is transmitted via an audio speaker of the user device 200. The warning prompt may include details regarding the outgoing communications, such as the emergency services number that received the communications, time and date of each communication, duration of each communication, fees for each communication, a cost summary of fees for all of the communications. In some instances, the warning prompt that is presented may feature two selection controls (e.g., buttons, checkboxes, etc.). The first selection control may enable a user to indicate that the communications are authorized, and the second selection control may enable the user to indicate that the communications are unauthorized. Thus, depending on the particular input passed by the interface module 222 to the scam protection engine 120, the scam protection engine 120 may take the appropriate action.

The notification module 226 may be directed by the scam protection engine 120 to provide recommendations regarding the uninstallation of applications that have been determined by the scam protection engine 120 to be malicious. The presentation of a recommendation may be accomplished by a visual notification message that is displayed on a display of the user device 200. In some instances, the visual notification message may be accompanied by an audible message that is transmitted via an audio speaker of the user device 200. The recommendation may include an application identifier of the application, a version number of the application, a notice that the application is potentially malicious, instructions regarding how to remove the application from the user device 200, and/or so forth.

Example Computing Node Components

Figure 3:
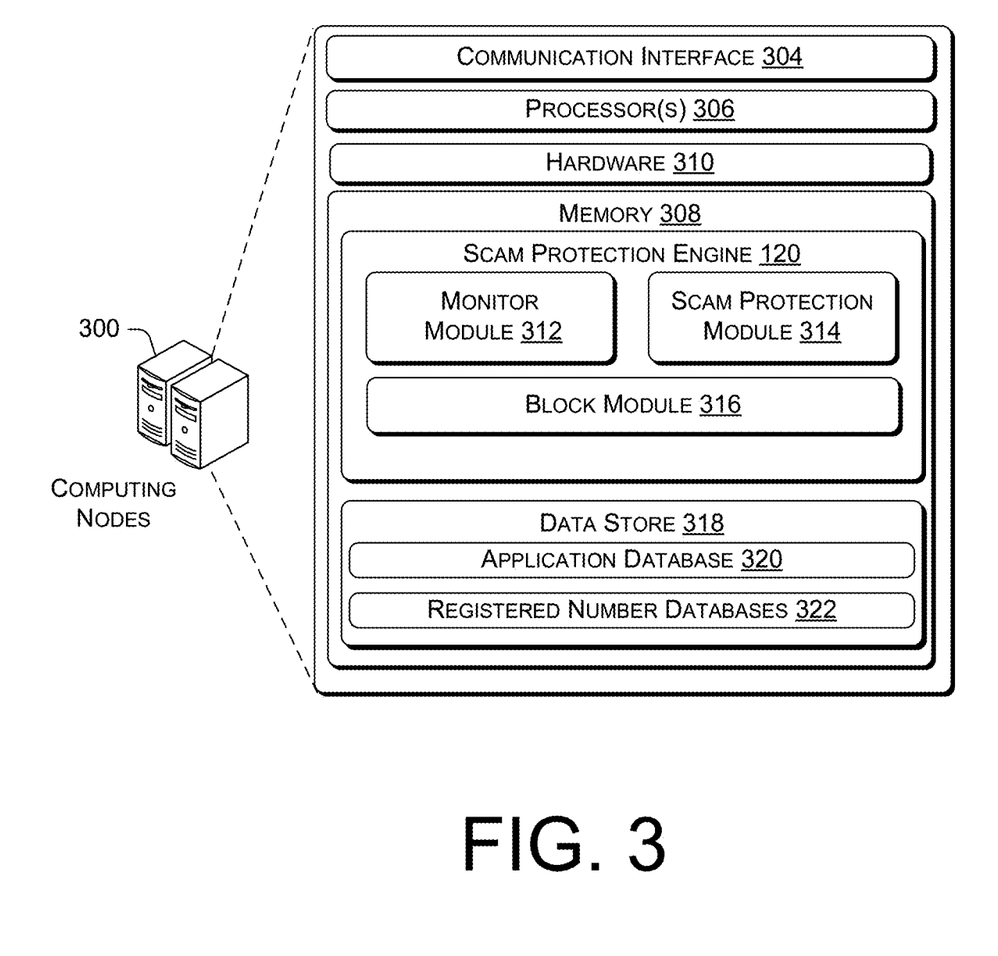
FIG. 3 is a block diagram showing various components of one or more illustrative computing nodes that implement a scam protection engine to protect subscribers from scam applications that initiate outgoing communications without the permission of the subscribers.

FIG. 3 is a block diagram showing various components of one or more illustrative computing nodes that implement a scam protection engine to protect subscribers from scam applications that initiate outgoing communications without the permission of the subscribers. The scam protection engine 120 may be implemented by the computing nodes 300. The computing nodes 300 may include a communication interface 304, one or more processors 306, and memory 308. The communication interface 304 may include wireless and/or wired communication components that enable the one or more computing nodes 300 to transmit data to and receive data from other networked devices. The computing nodes 300 may be accessed via hardware 310. The hardware 310 may include additional user interface, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The scam protection engine 120 may be stored in the memory 308. The scam protection engine 120 may include a monitor module 312, a scam protection module 314, and a block module 316. The modules may include routines, program instructions, objects, and/or data structures that perform particular tasks or implement particular abstract data types. The memory 308 may be further configured to implement a data store 318 that stores various databases.

The monitor module 312 may receive notifications from a user device regarding application installations that occur on the user device. Accordingly, the monitor module 312 may store the collected application installation information of individual user devices in corresponding data entries of an application database 320. Further, the monitor module 312 may monitor outgoing communications from the user device following a notification that a particular application is installed on a user device. The notification may be received from a monitor application (e.g., the monitor application 220), that is installed on a user device. The monitor module 312 may monitor the communications to determine whether the number of communications to a premium-rate number or an emergency services number exceeds a corresponding predetermined quantity threshold for a predetermined period of time. For example, the quantity threshold for the number of communications to a premium-rate number may be four in a one-hour period. In another example, the quantity threshold for the number of communications to an emergency services number may be four in an 8-hour period. In various embodiments, the monitor module 312 may have access to a registered number databases 322 of known premium-rate numbers and/or known emergency services numbers. The monitor module 312 may further have access to records of outgoing communications (e.g., call detail records (CDRs)) for the user device. For example, the monitor module 312 may access such information from one or more systems in the core network 104, such as an Online Charging System (OCS), a Business Support System (BSS), an Operations Support System (OSS), and/or so forth. The details in the record for a call or message may include a time and date of the call or the message, a duration of the call, a completion status of the call or the message, a source telephone number of the call or the message, a destination telephone number of the call or the message, a route by which the call or the message left the wireless carrier network 102, a call type of the call or the message (e.g., voice, multimedia, SMS, etc.), a disposition of the call (e.g., whether the call was connected, sent to voicemail, etc.), and/or any fault conditions associated with the call or the message. Accordingly, the monitor module 312 use such information to scan for communications to a premium-rate number or an emergency service number, and then determine whether the number of such communications in a predetermined time period exceeds a corresponding quantity threshold.

The scam protection module 314 may assess whether a pattern of the outgoing communications from a user device to the premium-rate number or an emergency number during the predetermined time period is an anomalous pattern. The scam protection module 314 may make such an assessment when the monitor module 312 determines that the number of such communications in a predetermined time period exceeds the corresponding quantity threshold. In some embodiments, the scam protection module 314 may use pattern-machine techniques to determine whether the pattern is anomalous. For example, the pattern of outgoing communications to a premium-rate number may be determined to be anomalous when a determined percentage of them occurred during a particular time period of the day for the geographical location where the corresponding user device is located (e.g., midnight to 6:00 a.m., 11:00 p.m. to 5:00 a.m., etc.). In another example, the pattern of outgoing communications to an emergency services number may be determined to be anomalous when they occur at a geographical location that corresponds to a workplace of a subscriber that is the user of the user device. In an additional example, the pattern of outgoing communications to a premium-rate number or an emergency service number may be determined to be anomalous when they occur consecutively within a certain time window (e.g., 5 minutes, 10 minutes, etc.).

In other embodiments, the scam protection module 314 may use machine-learning techniques to determine whether the pattern of outgoing communications is anomalous. The scam protection module 314 may use various classification schemes (explicitly and/or implicitly trained) and/or systems may be employed to make the determination. A classifier is a function that maps an input attribute vector, $x=(x_1, x_2, x_3, x_4, x_n)$, to a confidence that the input belongs to a class, that is, $f(x)=confidence(class)$. Such classification may employ a probabilistic and/or statistical-based analysis (e.g., factoring into the analysis utilities and costs). A support vector machine (SVM) is an example of a classifier that may be employed. The SVM operates by finding a hypersurface in the space of possible inputs, which hypersurface attempts to split the triggering criteria from the non-triggering events. Other directed and undirected model classification approaches include, e.g., naïve Bayes, Bayesian networks, decision trees, neural networks, fuzzy logic models, and probabilistic classification models providing different patterns of independence, any of which may also be employed.

Accordingly, the machine-learning techniques may compare characteristics of a pattern of outgoing communications to characteristics of known anomalous patterns to make a probabilistic determination of whether the pattern of outgoing communications is anomalous. For example, the scam protection module 314 may classify the pattern into a class of a plurality of classes that corresponds to multiple anomalous patterns. In another example, the scam protection module 314 may label the pattern as the anomalous pattern when the pattern deviates from a comparable pattern of a previous corresponding period of time by at least a predetermined deviation value (e.g., an absolute deviation value, an average absolute deviation value, a percent deviation value, a Chi-squared test value, etc.). Following a determination by the scam protection module 314 that the pattern of outgoing communications from the user device is anomalous, the scam protection module 314 may direct the user device to present a warning prompt that solicits input as to whether the pattern of outgoing communications is authorized or unauthorized.

In instances where the outgoing communications are to a premium-rate number, a received input indicating that the pattern of outgoing communications is unauthorized may trigger the scam protection module 314 to activate the block module 316 to block additional outgoing communications to the premium-rate number. Further, the scam protection module 314 may store a vote that the particular application that is installed immediately prior to the occurrence of the unauthorized outgoing communications as a malicious application. The vote may be stored in a database entry of an application database 320 that corresponds to the particular application. In this way, the scam protection module 314 may receive votes from multiple user devices during a predesignated time period as to whether the particular application is malicious or non-malicious. Thus, when a sufficient percentage of votes indicating that the particular application is malicious are received during the predesignated period of time (e.g., 75% of the total votes), the scam protection module 314 may designate the particular application as malicious. Accordingly, the scam protection module 314 may check the application database 320 to discover user devices that have the particular application installed, as well as direct those user devices to present a recommendation to remove the particular application from the user devices.

In instances where the outgoing communications are to an emergency services number, a received input indicating that the pattern of outgoing communications is unauthorized may trigger the scam protection module 314 to direct the user device to present a recommendation to remove the particular application. Further, the scam protection module 314 may store a vote that the particular application that is installed immediately prior to the occurrence of the unauthorized outgoing communications as a malicious application. The vote may be stored in a database entry of the application database 320 that corresponds to the particular application. In this way, the scam protection module 314 may receive votes from multiple user devices during a predesignated time period as to whether the particular application is malicious or non-malicious. Thus, when a sufficient percentage of votes indicating that the particular application is malicious are received during the predesignated period of time (e.g., 75% of the total votes), the scam protection module 314 may designate the particular application as malicious. Accordingly, the scam protection module 314 may check the application database 320 to discover user devices that have the particular application installed, as well as direct each those user devices to present a recommendation to remove (e.g., uninstall) the particular application from the user devices. In some embodiments, the scam protection module 314 may periodically repeat this check. In this way, as the monitor module 312 detects the installation of the particular application on one or more additional user devices, the scam protection module 314 may also direct each the additional user devices to present a recommendation to remove the particular application from the additional user devices.

In some embodiments, the pattern data for outgoing communications associated with applications that are designated as malicious or non-malicious may be used as training data to refine one or more machine-learning algorithms used by the scam protection module 314. For example, the pattern data for outgoing communications associated with applications that are designated as malicious may be used as training data for identifying patterns of outgoing communications as anomalous. Conversely, the pattern data for outgoing communications associated with applications that are designated as non-malicious may be used as training data for identifying patterns of outgoing communications as non-anomalous.

The block module 316 may be activated by the scam protection module 314 to initiate blocking of outgoing calls to a particular premium-rate number by the core network 104 for a designated amount of time. For example, the block module 316 may notify a Session Initiation Protocol (SIP) server, a Call Session Control Function (CSCF) server, or some other communication session function of the core network 104 to terminate any outgoing communications to the particular premium-rate number from the user device. The outgoing communications may be terminated without the communications reaching a recipient device associated with the premium-rate number. In such example, the block module 316 may identify the user device to the communication session function of the core network 104 via a device identifier, such as an International Mobile Station Equipment Identity (IMEI), a Mobile Equipment Identifier (MEID), Mobile Station International Subscriber Directory Number (MSISDN), or some other electronic serial number (ESN) of the user device. The device identifier may be accompanied by a request to terminate any outgoing communications to the particular premium-rate number. In turn, the communication session function may terminate or block the outgoing communications to the particular premium-rate number without the communications reaching a recipient device associated with the premium-rate number.

In some embodiments, the block module 316 may use a web server to provide an online portal that enables a user to configure or modify the blocking of outgoing communications to premium-rate numbers that originate from a user device of the subscriber. The user may access the online portal via a website or an IP address using a web browser, or a client application installed on the user device, such as the monitor application 220. The online portal may be accessed using authentication credentials (e.g., user identifier, password, biometric data, etc.) of a subscriber account that the user established with the wireless carrier network 102. In turn, the online portal may present checkboxes, selection menus, and/or other user interface controls that enable the user to designate premium-rate numbers for which outgoing communications are to be blocked or unblocked, the type of outgoing communication (e.g., voice call and/or message). The user interface controls of the online portal may further enable the user to configure a time duration or modify a default time duration for the blocking of outgoing communications to each premium-rate number.

Example Processes

Figure 4:
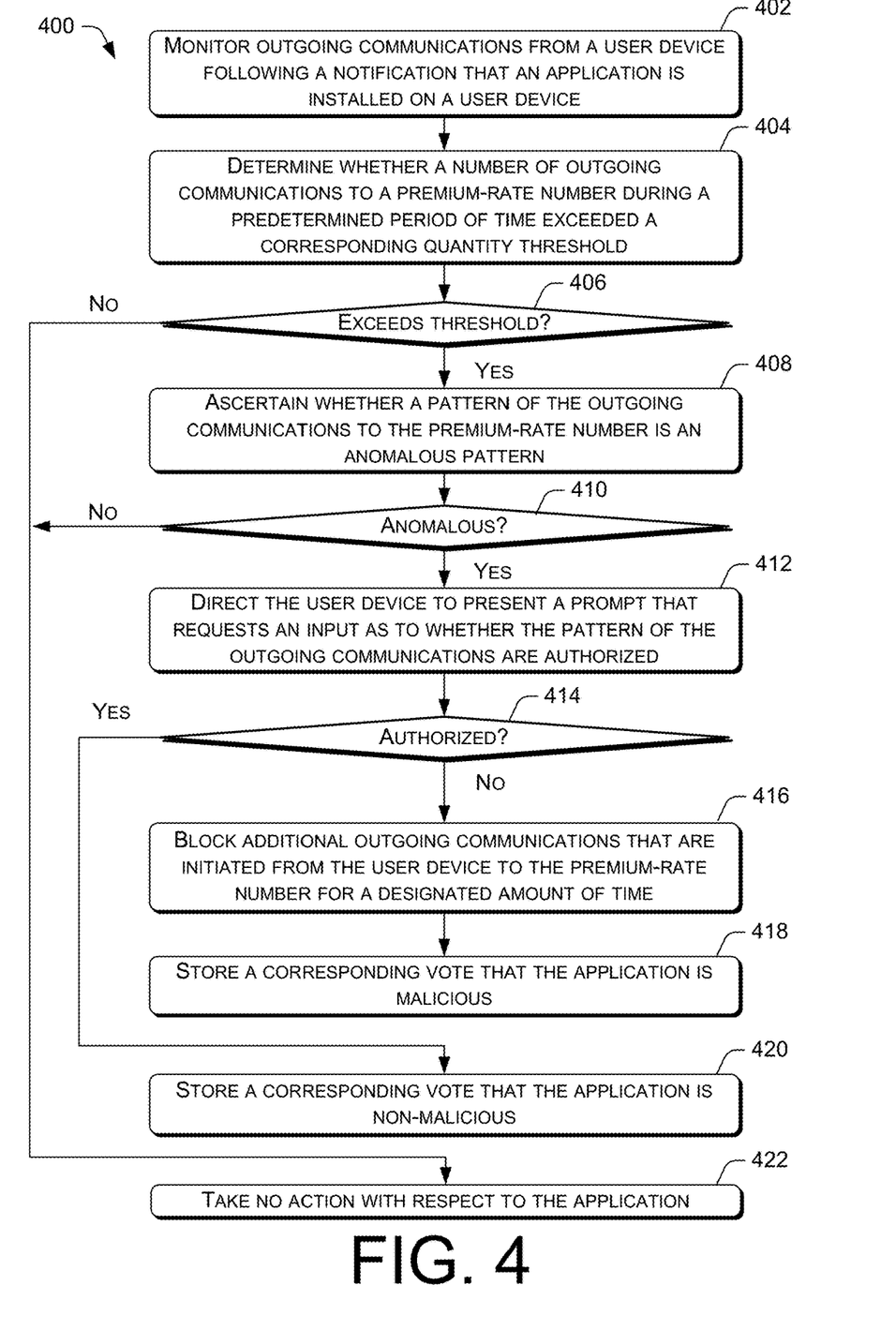
FIG. 4 is a flow diagram of an example process for a wireless carrier network to use a scam protection engine to protect subscribers from scam applications that initiate outgoing communications to premium-rate numbers without the permission of the subscribers.
Figure 5:
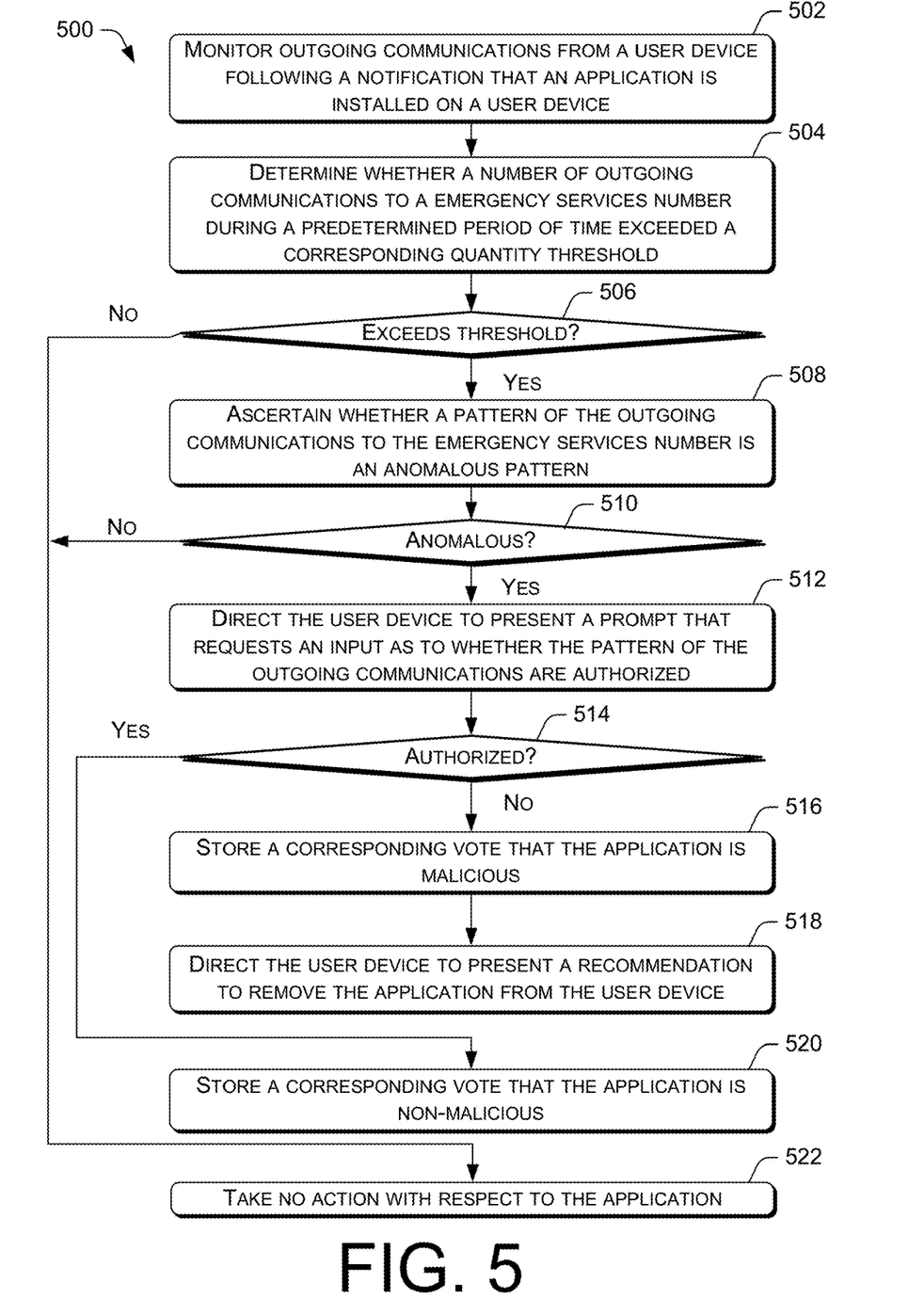
FIG. 5 is a flow diagram of an example process for a wireless carrier network to use a scam protection engine to protect subscribers from scam applications that initiate outgoing communications to emergency services numbers without the permission of the subscribers.
Figure 6:
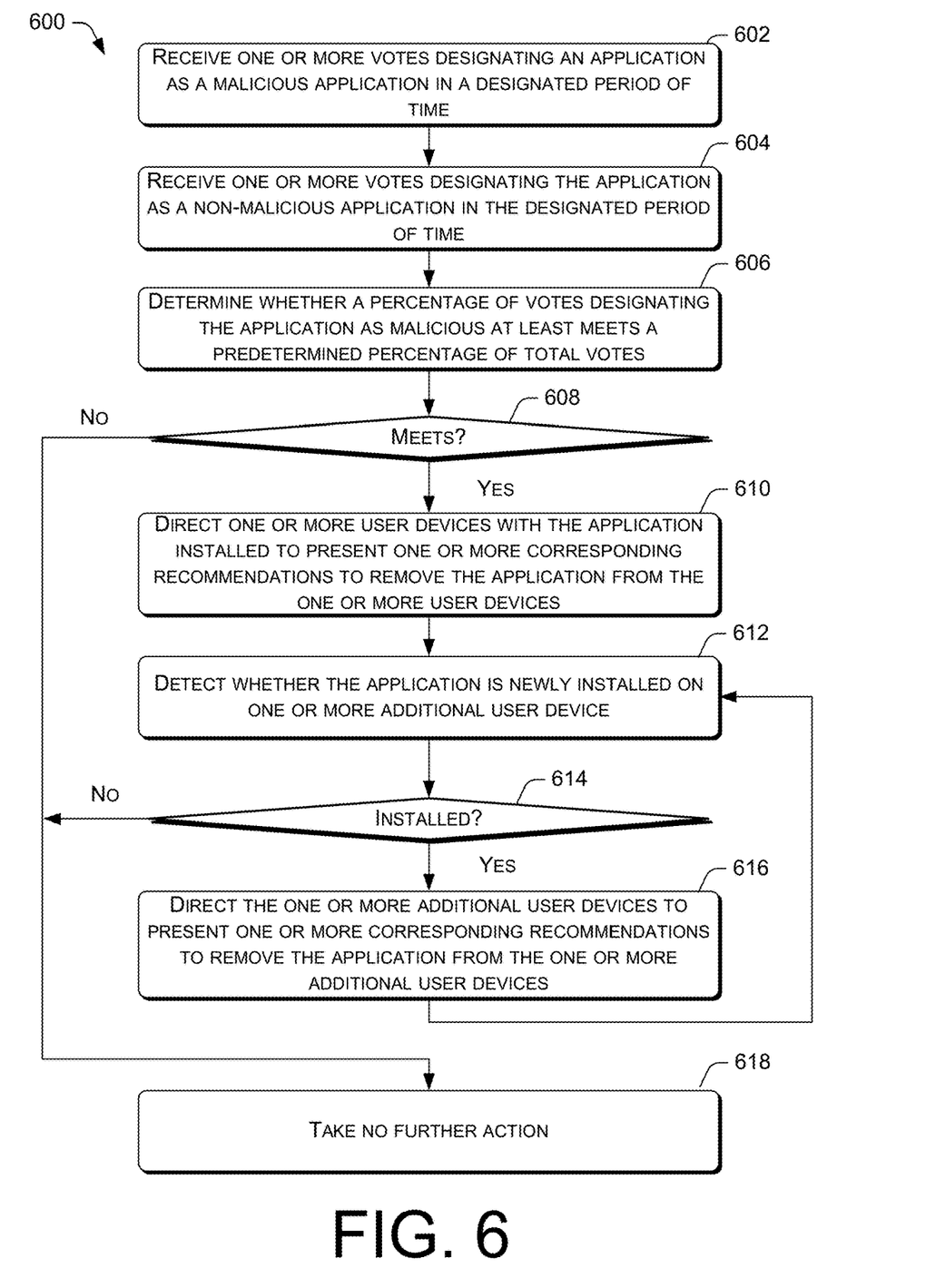
FIG. 6 is a flow diagram of an example process for a scam protection engine to notify subscribers to remove scam applications from user devices.

FIGS. 4-6 present illustrative processes 400-600 that may be implemented by a wireless carrier network to monitor outgoing communications from a suspected scam application installed on a user device of a subscriber to prevent the suspected scam application from initiating outgoing communications without the permission of the subscriber. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an example process 400 for a wireless carrier network to use a scam protection engine to protect subscribers from scam applications that initiate outgoing communications to premium-rate numbers without the permission of the subscribers. At block 402, the scam protection engine 120 may monitor outgoing communications from a user device following a notification that an application is installed on a user device. In various embodiments, a monitor application (e.g., the monitor application 220) may discover the installation of the application on the user device by access application installation information stored in an application installation log, an operating system program registry, or some other data store of an operating system for the user device.

At block 404, the scam protection engine 120 may determine whether a number of outgoing communications to a premium-rate number during a predetermined period of time exceeded a corresponding quantity threshold. In various embodiments, the quantity threshold is established to allow the user device to place a limited number of communications to the premium-rate number in the predetermined period of time without triggering further scrutiny by the scam protection service. For example, the predetermined period of time may be 8 hours, 12 hours, 24 hours, etc.

At decision block 406, if the number of the outgoing communications exceeded the quantity threshold ("yes" at decision block 406), the process 400 may proceed to block 408. At block 408, the scam protection engine 120 may ascertain whether a pattern of the outgoing communications to the premium-rate number is an anomalous pattern. In various embodiments, the scam protection engine 120 may use pattern matching techniques or machine-learning techniques to determine whether the pattern of the outgoing communications is anomalous.

At decision block 410, if the pattern of outgoing communications is determined to be anomalous ("yes" at decision block 410), the process 400 may proceed to block 412. At the block 412, the scam protection engine 120 may direct the user device to present a prompt that requests an input as to whether the pattern of the outgoing communications is authorized. In various embodiments, the prompt may be in the form of a warning prompt that includes selection controls. The first selection control may enable a user to indicate that the communications are authorized, and the second selection control may enable the user to indicate that the communications are unauthorized. The selected indication is sent by the user device to the scam protection engine 120.

At decision block 414, if an input that the pattern of the outgoing communications are unauthorized is received ("no" at decision block 414), the process 400 may proceed to block 416. At block 416, the scam protection engine 120 may block additional outgoing communications that are initiated from the user device to the premium-rate number for a designated period of time. In various embodiments, the scam protection engine 120 may direct a core network 104 of the wireless carrier network to terminate the additional outgoing communications to the particular premium-rate number from the user device without the communications reaching a recipient device associated with the premium-rate number.

At block 418, the scam protection engine 120 may store a corresponding vote that the application is malicious. Returning to decision block 414, if an input that the pattern of the outgoing calls is authorized is received ("yes" at decision block 414), the process 400 may proceed to block 420. At block 420, the scam protection engine 120 may store a corresponding vote that the application is non-malicious. Returning to decision block 406, if the number of the outgoing communications does not exceed the quantity threshold ("no" at decision block 406), the process 400 may proceed to block 422. At block 422, the scam protection engine 120 may take no further action with respect to the application. Returning to decision block 410, if the pattern of outgoing communications is determined to be non-anomalous ("no" at decision block 410), the process 500 may also proceed to block 422.

FIG. 5 is a flow diagram of an example process 500 for a wireless carrier network to use a scam protection engine to protect subscribers from scam applications that initiate outgoing communications to emergency services numbers without the permission of the subscribers. At block 502, the scam protection engine 120 may monitor outgoing communications from a user device following a notification that an application is installed on a user device. In various embodiments, a monitor application (e.g., monitor application 220) may discover the installation of the application on the user device by access application installation information stored in an application installation log, an operating system program registry, or some other data store of an operating system for the user device.

At block 504, the scam protection engine 120 may determine whether a number of outgoing communications to an emergency services number during a predetermined period of time exceeded a corresponding quantity threshold. In various embodiments, the quantity threshold is established to allow the user device to place a limited number of communications to the emergency services number in the predetermined period of time without triggering further scrutiny by the scam protection service. For example, the predetermined period of time may be 8 hours, 12 hours, 24 hours, etc.

At decision block 506, if the number of the outgoing communications exceeded the quantity threshold ("yes" at decision block 506), the process 500 may proceed to block 508. At block 508, the scam protection engine 120 may ascertain whether a pattern of the outgoing communications to the premium-rate number is an anomalous pattern. In various embodiments, the scam protection engine 120 may use pattern matching techniques or machine-learning techniques to determine whether the pattern of the outgoing communications is anomalous.

At decision block 510, if the pattern of outgoing communications is determined to be anomalous ("yes" at decision block 510), the process 500 may proceed to block 512. At block 512, the scam protection engine 120 may direct the user device to present a prompt that requests an input as to whether the pattern of the outgoing communications is authorized. In various embodiments, the prompt may be in the form of a warning prompt that includes selection controls. The first selection control may enable a user to indicate that the communications are authorized, and the second selection control may enable the user to indicate that the communications are unauthorized. The selected indication is sent by the user device to the scam protection engine 120.

At decision block 514, if an input that the pattern of the outgoing communications are unauthorized is received ("no" at decision block 514), the process 500 may proceed to block 516. At block 516, the scam protection engine 120 may store a corresponding vote that the application is malicious. At block 518, the scam protection engine 120 may direct the user device to present a recommendation to remove the application from the user device. In various embodiments, the recommendation may include an application identifier of the application, a version number of the application, a notice that the application is potentially malicious, instructions regarding how to remove the application from the user device, and/or so forth.

Returning to decision block 514, if an input that the pattern of the outgoing calls is authorized is received ("yes" at decision block 514), the process 500 may proceed to block 520. At block 520, the scam protection engine 120 may store a corresponding vote that the application is non-malicious. Returning to decision block 506, if the number of the outgoing communications does not exceed the quantity threshold ("no" at decision block 506), the process 500 may proceed to block 522. At block 522, the scam protection engine 120 may take no further action with respect to the application. Returning to decision block 510, if the pattern of outgoing communications is determined to be non-anomalous ("no" at decision block 510), the process 500 may also proceed to block 522.

FIG. 6 is a flow diagram of an example process 600 for a scam protection engine to notify subscribers to remove scam applications from user devices. At block 602, the scam protection engine 120 may receive one or more votes designating an application as a malicious application in a designated period of time. At block 604, the scam protection engine 120 may receive one or more votes designating the application as a non-malicious application in the designated time period. At block 606, the scam protection engine 120 may determine whether a percentage of the votes designating the application as malicious at least meets a predetermined percentage of the total votes. At decision block 608, if the percentage of such votes at least meets the predetermined percentage of the total votes ("yes" at decision block 608), the process 600 may proceed to block 610. At block 610, the scam protection engine 120 may direct one or more user devices with the application installed to present one or more corresponding recommendations to remove the application from the one or more user devices. In various embodiments, a recommendation may include an application identifier of the application, a version number of the application, a notice that the application is potentially malicious, instructions regarding how to remove the application from the user device, and/or so forth.

At block 612, the scam protection engine 120 may detect whether the application is newly installed on one or more additional user devices. At decision block 614, if the application is newly installed the one or more additional user devices ("yes" at decision block 614), the process 600 may proceed to block 616. At block 616, the scam protection engine 120 may direct the one or more additional user devices to present one or more corresponding recommendations to remove the application from the one or more additional user devices. Subsequently, the process 600 may loop back to the block 612.

Returning to decision block 608, if the percentage of such votes does not meet the predetermined percentage of the total votes ("no" at decision block 608), the process 600 may proceed to block 618. At block 618, the scam protection engine 120 may take no further action. Returning to decision block 614, if the application is not newly installed on any additional user devices ("no" at decision block 614), the process 600 may further proceed to block 618.

The techniques may enable an MNO to protect subscribers from scam applications that are designed to fraudulently obtain money from the subscribers and/or harass the subscribers. In this way, rather than merely acting as a communication conduit for subscriber data, the MNO may play a key role in protecting subscribers from malicious actors and increase subscriber satisfaction with the services provided by the MNO.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a core network of a wireless carrier network storing computer-executable instructions that upon execution cause one or more processors to perform acts comprising:

monitoring outgoing communications from a user device following a notification that an application is installed on a user device, the outgoing communications including at least one of one or more voice calls or one or more messages to a premium-rate number;

determining that a number of the outgoing communications to the premium-rate number during a predetermined period of time exceeded a corresponding quantity threshold;

ascertaining, via a pattern matching algorithm or a machine-learning algorithm, that a pattern of the outgoing communications for which the number exceed the corresponding quantity threshold during the predetermined period of time is an anomalous pattern;

directing the user device to present a prompt that requests an input at the user device as to whether the outgoing communications are authorized as a result of the pattern fitting the anomalous pattern;

in response to a first input from the user device indicating that the outgoing communications to the premium-rate number are unauthorized, blocking additional outgoing communications from the user device to the premium-rate number for a predesignated amount of time, and storing the first input as a corresponding vote that the application is malicious; and in response to a second input from the user device indicating that the outgoing communications to the premium-rate number are authorized, storing the second input as a corresponding vote that the application is non-malicious.

2. The one or more non-transitory computer-readable media of claim 1, further comprising, in response to a percentage of votes designating the application as malicious at least meeting a predetermined percentage threshold, directing the user device to present a recommendation to remove the application from the user device.

3. The one or more non-transitory computer-readable media of claim 1, further comprising, in response to a percentage of votes designating the application as malicious at least meeting a predetermined percentage threshold and determining that the application is installed on an additional user device, directing the additional user device to present a recommendation to remove the application from the additional user device.

4. The one or more non-transitory computer-readable media of claim 1, further comprising, in response to a percentage of votes designating the application as malicious at least meeting a predetermined percentage threshold and detecting that the application is newly installed on one or more user devices, directing the one or more user devices to present one or more corresponding recommendations to remove the application from the one or more user devices.

5. The one or more non-transitory computer-readable media of claim 1, wherein the prompt includes a cost summary of fees that are incurred for the outgoing communications to the premium-rate number.

6. The one or more non-transitory computer-readable media of claim 1, wherein the ascertaining includes classifying the pattern into a class of a plurality of classes that corresponds to multiple anomalous patterns, or labeling the pattern as the anomalous pattern when the pattern deviates from a comparable pattern of a previous corresponding period of a time by at least a predetermined deviation value.

7. The one or more non-transitory computer-readable media of claim 1, wherein the acts further comprise refining the machine-learning algorithm based on the pattern of the outgoing communications being designated as anomalous.

8. The one or more non-transitory computer-readable media of claim 1, wherein the one or more messages include a Short Message Service (SMS) message, a Rich Communication Services (RCS) message, or a Multimedia Messaging Service (MMS) message.

9. A system, comprising:
one or more processors; and
memory including a plurality of computer-executable components that are executable by the one or more processors to perform a plurality of actions, the plurality of actions comprising:
monitoring outgoing communications from a user device following a notification that an application is installed on a user device, the outgoing communications including at least one of one or more voice calls or one or more messages to an emergency services number;
determining that a number of the outgoing communications to the emergency services number during a predetermined period of time exceeded a corresponding quantity threshold;
ascertaining, via a pattern matching algorithm or a machine-learning algorithm, that a pattern of the outgoing communications for which the number exceed the corresponding quantity threshold during the predetermined period of time is an anomalous pattern;

directing the user device to present a prompt that requests an input at the user device as to whether the outgoing communications are authorized as a result of the pattern fitting the anomalous pattern;
in response to a first input from the user device indicating that the outgoing communications to the emergency services number are not authorized, directing the user device to present a recommendation to remove the application from the user device, and storing the first input as a corresponding vote that the application is malicious; and
in response to a second input from the user device indicating that the outgoing communications to the emergency services number are authorized, storing the second input as a corresponding vote that the application is non-malicious.

10. The system of claim 9, further comprising, in response to a percentage of votes designating the application as malicious at least meeting a predetermined percentage threshold and determining that the application is installed on an additional user device, directing the additional user device to present a recommendation to remove the application from the additional user device.

11. The system of claim 9, further comprising, in response to a percentage of votes designating the application as malicious at least meeting a predetermined percentage threshold and detecting that the application is newly installed on one or more user devices, directing the one or more user devices to present one or more corresponding recommendations to remove the application from the one or more user devices.

12. The system of claim 9, wherein the ascertaining includes classifying the pattern into a class of a plurality of classes that corresponds to multiple anomalous patterns, or labeling the pattern as the anomalous pattern when the pattern deviates from a comparable pattern of a previous corresponding period of a time by at least a predetermined deviation value.

13. The system of claim 9, wherein the acts further comprise refining the machine-learning algorithm based on the pattern of the outgoing communications being designated as anomalous.

14. The system of claim 9, wherein the one or more messages include a Short Message Service (SMS) message, a Rich Communication Services (RCS) message, or a Multimedia Messaging Service (MMS) message.

15. A computer-implemented method, comprising:
monitoring, via one or more computing nodes, outgoing communications from a user device following a notification that an application is installed on a user device, the outgoing communications including at least one of one or more voice calls or one or more messages to a premium-rate number;
determining, via the one or more computing nodes, that a number of the outgoing communications to the premium-rate number during a predetermined period of time exceeded a corresponding quantity threshold;
ascertaining, via a pattern matching algorithm or a machine-learning algorithm that is executed by the one or more computing nodes, that a pattern of the outgoing communications for which the number exceed the corresponding quantity threshold during the predetermined period of time is an anomalous pattern;
directing, via the one or more computing nodes, the user device to present a prompt that requests an input at the user device as to whether the outgoing communications are authorized as a result of the pattern fitting the anomalous pattern;

in response to a first input from the user device indicating that the outgoing communications to the premium-rate number are unauthorized, blocking, via the one or more computing nodes, additional outgoing communications from the user device to the premium-rate number for a predesignated amount of time, and storing the first input as a corresponding vote that the application is malicious; and in response to a second input from the user device indicating that the outgoing communications to the premium-rate number are authorized, storing, via the one or more computing nodes, the second input as a corresponding vote that the application is non-malicious.

16. The computer-implemented method of claim 15, further comprising, in response to a percentage of votes designating the application as malicious at least meeting a predetermined percentage threshold, directing the user device to present a recommendation to remove the application from the user device.

17. The computer-implemented method of claim 15, further comprising, in response to a percentage of votes designating the application as malicious at least meeting a predetermined percentage threshold and determining that the application is installed on an additional user device, directing the additional user device to present a recommendation to remove the application from the additional user device.

18. The computer-implemented method of claim 15, further comprising, in response to a percentage of votes designating the application as malicious at least meeting a predetermined percentage threshold and detecting that the application is newly installed on one or more user devices, directing the one or more user devices to present one or more corresponding recommendations to remove the application from the one or more user devices.

* * * * *